(12) United States Patent
Jung et al.

(10) Patent No.: US 12,091,193 B2
(45) Date of Patent: Sep. 17, 2024

(54) METHOD AND APPARATUS FOR INSPECTING AERONAUTICAL LIGHT USING AERIAL VEHICLE

(71) Applicants: Korea Airports Corporation, Seoul (KR); Youyang Airport Lighting Equipment Inc., Gyeonggi-do (KR)

(72) Inventors: Jin Seob Jung, Seoul (KR); Chae Taek Lim, Jeollanam-do (KR); Byung Joo Park, Seoul (KR); Dae Sin Yu, Seoul (KR); Dae Young Lim, Gyeonggi-do (KR); Kwang Ock Ryu, Gyeonggi-do (KR); Young Il Go, Seoul (KR)

(73) Assignees: Korea Airports Corporation, Seoul (KR); Youyang Airport Lighting Equipment Inc., Gyeonggi-do (KR)

( * ) Notice: Subject to any disclaimer, the term of this patent is extended or adjusted under 35 U.S.C. 154(b) by 397 days.

(21) Appl. No.: 17/763,553

(22) PCT Filed: Jun. 9, 2021

(86) PCT No.: PCT/KR2021/007207
§ 371 (c)(1),
(2) Date: Mar. 24, 2022

(87) PCT Pub. No.: WO2022/145597
PCT Pub. Date: Jul. 7, 2022

(65) Prior Publication Data
US 2023/0166863 A1   Jun. 1, 2023

(30) Foreign Application Priority Data

Dec. 31, 2020   (KR) .................. 10-2020-0189614

(51) Int. Cl.
*B64F 1/20*   (2006.01)
*B64C 39/02*   (2023.01)
(Continued)

(52) U.S. Cl.
CPC .............. *B64F 1/20* (2013.01); *B64C 39/024* (2013.01); *G05D 1/042* (2013.01); *G05D 1/101* (2013.01);
(Continued)

(58) Field of Classification Search
CPC . B64F 1/20; B64F 1/18; B64C 39/024; G05D 1/042; G05D 1/101; G06T 7/0004;
(Continued)

(56) References Cited

U.S. PATENT DOCUMENTS 7,624,696 B2 * 12/2009 Desourdis ................. B64F 1/20
116/63 P
11,713,135 B2 * 8/2023 Ferrell ...................... G08G 5/06
701/120

(Continued)

FOREIGN PATENT DOCUMENTS

| CN | 105222807 A | 1/2016 |
| CN | 106813900 A | 6/2017 |

(Continued)

OTHER PUBLICATIONS

Lee et al., "Development of Inspection System for NAVAID Using Drone." Journal of the Korean Society for Aviation and Aeronautics. vol. 26, No. 4, pp. 110-115, Dec. 2018.

*Primary Examiner* — Mussa A Shaawat
(74) *Attorney, Agent, or Firm* — Downs Rachlin Martin PLLC (57) ABSTRACT

A method and apparatus for inspecting an aeronautical light using an aerial vehicle are disclosed. The method includes defining a first reference point based on a plurality of aeronautical lights installed on a runway surface, and defining a second reference point based on the first reference point, defining a flight path of the aerial vehicle taking off from the second reference point and heading to the first (Continued)

reference point, transmitting, to the ground, an image of the aeronautical lights photographed by the aerial vehicle, and inspecting and adjusting elevation angles of the aeronautical lights by analyzing the image of the aeronautical lights in real time.

13 Claims, 8 Drawing Sheets

(51) Int. Cl.
- *G05D 1/00* (2006.01)
- *G05D 1/04* (2006.01)
- *G05D 1/10* (2006.01)
- *G06T 7/00* (2017.01)
- *G06V 20/10* (2022.01)
- *G06V 20/17* (2022.01)
- *B64U 101/30* (2023.01)

(52) U.S. Cl.
CPC ............ *G06T 7/0004* (2013.01); *G06V 20/17* (2022.01); *G06V 20/176* (2022.01); *B64U 2101/30* (2023.01); *B64U 2201/10* (2023.01); *G06T 2207/10032* (2013.01)

(58) Field of Classification Search
CPC .......... G06T 2207/10032; G07V 20/17; G07V 20/176; B64U 2101/30; B64U 2201/10; B64U 10/13; B64D 47/08
See application file for complete search history.

(56) References Cited

U.S. PATENT DOCUMENTS

| | | | |
|---|---|---|---|
| 2011/0032519 A1* | 2/2011 | Coletti | G01C 9/06 33/366.23 |
| 2017/0289463 A1* | 10/2017 | Asao | B64D 11/0015 |
| 2018/0057135 A1* | 3/2018 | Yan | B64C 1/08 |
| 2019/0031337 A1* | 1/2019 | McCullough | B64U 30/297 |
| 2019/0144108 A1* | 5/2019 | McCullough | G05D 1/102 244/23 B |
| 2019/0144114 A1* | 5/2019 | Chen | G07C 5/06 701/2 |
| 2021/0237381 A1* | 8/2021 | Hafenrichter | B64C 39/024 |
| 2021/0237867 A1* | 8/2021 | Georgeson | B64U 30/29 |
| 2021/0356255 A1* | 11/2021 | Sweers | G01B 11/303 |
| 2022/0004204 A1* | 1/2022 | McCullough | B64C 17/00 |
| 2022/0295025 A1* | 9/2022 | Seidel | G03B 21/2033 |
| 2022/0413127 A1* | 12/2022 | Ferla | G01S 1/18 |

FOREIGN PATENT DOCUMENTS

| | | |
|---|---|---|
| CN | 109827754 A | 5/2019 |
| ES | 2687869 A1 | 10/2018 |
| FR | 3042035 A1 | 4/2017 |
| KR | 101489488 B1 | 2/2015 |
| KR | 10-2018-0043496 A | 4/2018 |
| KR | 1020180127746 A | 11/2018 |
| KR | 102008175 B1 | 8/2019 |
| KR | 102164222 B1 | 10/2020 |
| WO | 2019144317 A1 | 8/2019 |

* cited by examiner

METHOD AND APPARATUS FOR INSPECTING AERONAUTICAL LIGHT USING AERIAL VEHICLE

TECHNICAL FIELD

The following description relates to a method and apparatus for inspecting an aeronautical light using an aerial vehicle.

BACKGROUND ART

An aeronautical light, which is the collective denomination for lighting facilities that help take-off and landing of an aircraft for flight safety at night or under visual meteorological conditions, includes a precision approach path indicator (PAPI), an approach lighting system (ALS), a runway edge light (REDL), a runway threshold light (RTHL), a runway threshold identification light (RTIL), a runway center line light (RCLL), a touch-down zone light (TDZL), a runway end light (RENL), and the like. The aeronautical light, which is a facility directly related to the flight safety of an aircraft, requires precision in its inspection. In a conventional aeronautical light inspection method, an inspection method using a time and equipment such as a level is performed on the ground. However, the ground inspection method has a fundamental limitation in that it cannot be inspected from the field of view of an actual aircraft because it is performed only on the ground. Recently, with the development of aerial vehicle navigation technology, aerial vehicles are being used in various fields. If the aerial vehicle navigation technology is used in an aeronautical light inspection method, it is expected that it will be possible to precisely inspect an aeronautical light in the field of view of the actual aircraft, and measure and inspect the aeronautical light more quickly.

The above-described background technology is possessed or acquired by the inventor in a derivation process of the present invention, and is not necessarily a known technology disclosed to the general public prior to filing of the present application.

DISCLOSURE OF THE INVENTION

Technical Goals

An aspect provides a method and apparatus for inspecting an aeronautical light using an aerial vehicle, the method and apparatus capable of precisely and quickly inspecting the aeronautical light.

Technical goals to be achieved by aspects are not limited to the technical goal mentioned above, and other technical goals not mentioned will be clearly understood by those skilled in the art from the following description.

Technical Solutions

According to an aspect, there is provided a method for inspecting an aeronautical light using an aerial vehicle, the method including defining a first reference point based on a plurality of aeronautical lights installed on a runway surface, and defining a second reference point based on the first reference point, defining a flight path of the aerial vehicle taking off from the second reference point and heading to the first reference point, transmitting, to the ground, an image of the aeronautical lights photographed by the aerial vehicle, and inspecting and adjusting elevation angles of the aeronautical lights by analyzing the image of the aeronautical lights in real time.

According to an aspect, the defining of the flight path may include generating, based on the first reference point and the second reference point, an inspection flight path including a latitude value, a longitude value, and an altitude value, and allowing the aerial vehicle to perform an automatic flight according to the flight path by providing the inspection flight path to the aerial vehicle.

According to an aspect, the allowing of the aerial vehicle to perform the automatic flight may include determining that the aeronautical lights are abnormal, and temporarily stopping a flight so as to inspect the aeronautical lights, when the elevation angles of the aeronautical lights are out of an allowable range.

According to an aspect, the inspection flight path may include a first path in which the aerial vehicle performs a vertically ascending flight from the second reference point.

According to an aspect, the inspection flight path may include a second path in which the aerial vehicle performs leftward and rightward flight at a predetermined altitude around a connection line that connects the first reference point and the second reference point to each other after ascending to the first path, and performs the leftward and rightward flight again and descends after descending at the predetermined altitude.

According to an aspect, the inspection flight path may include a third path in which the aerial vehicle performs a flight in a forward direction closer to the first reference point while maintaining a predetermined altitude.

According to an aspect, the inspection flight path may include a fourth path in which the aerial vehicle performs a leftward and rightward flight at a predetermined altitude around a connection line that connects the first reference point and the second reference point to each other, and performs the leftward and rightward flight again and descends after descending at the predetermined altitude.

According to an aspect, the inspection flight path may include a fifth path in which the aerial vehicle performs a flight in a forward direction closer to the first reference point while maintaining the predetermined altitude after descending to the fourth path.

According to an aspect, the inspection flight path may include a sixth path in to which the aerial vehicle departs from a predetermined altitude, and performs a forward descending flight after performing a forward ascending flight closer to the first reference point.

According to an aspect, the aeronautical lights may be a precision approach path indicator (PAPI), an approach lighting system (ALS), a runway edge light (REDL), a runway threshold light (RTHL), a runway threshold identification light (RTIL), a runway center line light (RCLL), a touch-down zone light (TDZL), and a runway end light (RENL).

According to an aspect, the first reference point may be a point where an axis that connects the plurality of aeronautical lights and a runway center line meet.

According to an aspect, the second reference point may be a point spaced apart from the first reference point by a predetermined distance.

According to another aspect, there is provided an apparatus for inspecting an aeronautical light using an aerial vehicle, the apparatus including a controller provided in the aerial vehicle, the controller configured to define a flight path for the aerial vehicle, an image camera configured to photograph an image of a plurality of aeronautical lights on a runway as the aerial vehicle performs a flight in the flight path, a communicator connected to the controller and the image camera, the communicator configured to convert data of the controller and the image camera into a radio signal and transmit the radio signal, a remote controller provided on the ground, the remote controller connected to the communicator through a wireless communication network so as to remotely control the controller, and an image analyzer connected to the communicator through the wireless communication network so as to verify and analyze image data of the image camera on the ground.

Advantageous Effects

As described above, according to aspects, a method and apparatus for inspecting an aeronautical light using an aerial vehicle may inspect an aeronautical light from a field of view of an aircraft using the aerial vehicle, thereby inspecting the aeronautical light more precisely than inspecting the aeronautical light on the ground so as to contribute to a safe operation of an aircraft.

Effects of the method and apparatus for inspecting an aeronautical light using an aerial vehicle according to an aspect are not limited to those mentioned above, and other effects not mentioned will be clearly understood by those skilled in the art from the following description.

The following drawings attached to the present specification illustrate preferred example embodiments of the present invention, and serve to provide further understanding of the technical spirit of the present invention together with the detailed description of the invention, so that the present invention is not construed as being limited to the drawings.

BEST MODE FOR CARRYING OUT THE INVENTION

Hereinafter, example embodiments are described in detail with reference to the accompanying drawings. Various modifications may be made to the example embodiments. The example embodiments are not construed as being limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

In addition, when describing the example embodiments with reference to the accompanying drawings, like reference numerals refer to like components and a repeated description related thereto will be omitted. When describing the example embodiments, detailed description of well-known related structures or functions will be omitted when it is deemed that such description will cause ambiguous interpretation of the example embodiments.

In addition, it will be understood that, although the terms first, second, A, B, (a), (b), and the like may be used herein to describe various components of the example embodiments, these terms are only used to distinguish one component from another component and essential, order, or sequence of corresponding components are not limited by these terms. It will be understood that when one component is referred to as being "connected to", "coupled to", or "linked to" another component, one component may be "connected to", "coupled to", or "linked to" another component via a further component although one component may be directly connected to or directly linked to another component.

The same name may be used to describe a component included in an example embodiment and a component having a common function in another example embodiment. Unless otherwise mentioned, the description on the example embodiment may be applicable to the other example embodiment and thus, duplicated description will be omitted for conciseness.

Figure 1:
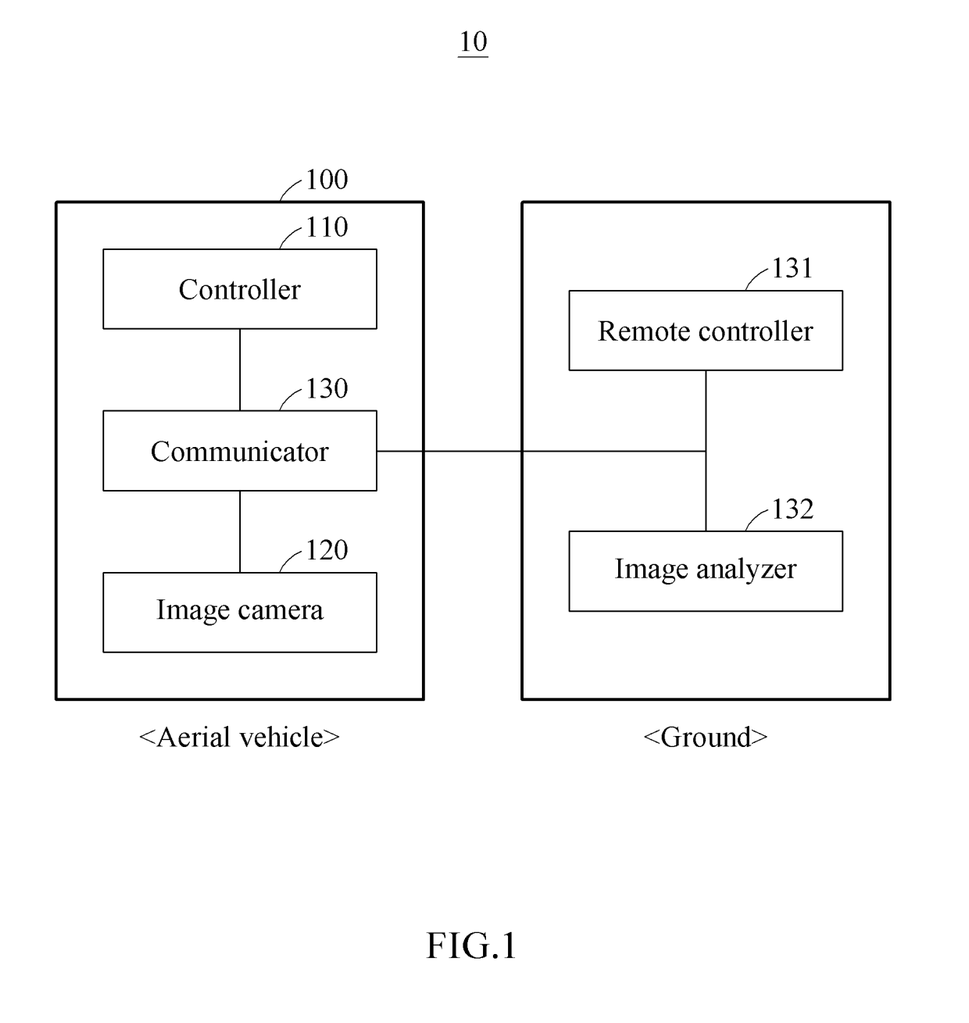
FIG. 1 is a block diagram illustrating a configuration of an aeronautical light inspection apparatus using an aerial vehicle according to an example embodiment.

FIG. 1 is a block diagram illustrating a configuration of an aeronautical light inspection apparatus 10 using an aerial vehicle according to an example embodiment.

Referring to FIG. 1, the aeronautical light inspection apparatus 10 using an aerial vehicle according to an example embodiment may include a controller 110, an image camera 120, a communicator 130, a remote controller 131, and an image analyzer 132. Here, the aeronautical light may include, for example, at least one light of a precision approach path indicator (PAPI), an approach lighting system (ALS), a runway edge light (REDL), a runway threshold light (RTHL), a runway threshold identification light (RTIL), a runway center line light (RCLL), a touch-down zone light (TDZL), and a runway end light (RENL). An installation angle and an illuminance with respect to the ground may be different for each aeronautical light.

First, the controller 110 defines a flight path for the aerial vehicle 100. That is, the controller 110 may be connected to a power unit (not illustrated) of the aerial vehicle 100 to serve to allow the aerial vehicle 100 to perform an automatic flight in the inputted flight path. Here, the aerial vehicle 100 refers to the aerial vehicle 100 that does not have a crew on board, and navigates by automatic guidance based on an instruction from the outside, and in general, may exemplify a drone.

In flight of the aerial vehicle 100, the controller 110 may input a flight path of the aerial vehicle 100 so that an upward and downward flight, a leftward and rightward flight, a forward and backward flight, and the like are performed.

First, the upward and downward flight may be a flight in which the aerial vehicle 100 is moved in upward and downward directions from a current location.

By controlling the aerial vehicle 100 to perform the upward and downward flight, the controller 110 may support the image camera 120 to be described later to verify an elevation angle and an illuminance of an aeronautical light according to an altitude.

In addition, the leftward and rightward flight may be a flight in which the aerial vehicle 100 is moved in left and right directions from the current location.

By controlling the aerial vehicle 100 to perform the leftward and rightward flight, the controller 110 may also support the image camera 120 to verify left and right coverage angles, an elevation angle, and an illuminance of the aeronautical light, while maintaining the same altitude.

In addition, the forward and backward flight may be a flight in which the aerial vehicle 100 is moved in a forward direction closer to the aeronautical light from the current location and a backward direction away from the aeronautical light from the current location.

By controlling the aerial vehicle 100 to perform the forward and backward flight, the controller 110 may also support the image camera 120 to verify an elevation angle and an illuminance of the aeronautical light, while maintaining the same altitude and moving to the aeronautical light.

In addition, the controller 110 may control the aerial vehicle 100 to perform a forward ascending flight, a forward descending flight, a backward ascending flight, backward descending flight, and the like.

In addition, by selecting multiple flights from among the upward and downward flight, leftward and rightward flight, forward and backward flight, forward ascending flight, forward descending flight, backward ascending flight, backward descending flight, the controller 110 may control the aerial vehicle 100 to simultaneously perform different types of flights.

In addition, the controller 110 may further include a GPS module that receives GPS data and coordinate values of the aerial vehicle 100 in real time, compares the received GPS data and coordinate values with the flight path inputted into the controller 110, and verifies whether the aerial vehicle 100 performs a flight at a fixed time and a fixed location, so as to support to precisely calibrate a flight location.

As the aerial vehicle 100 performs a flight in the flight path, the image camera 120 photographs an image of a plurality of aeronautical lights on a runway. That is, the image camera 120 may photograph an image of an aeronautical light according to a distance between an altitude of the aerial vehicle 100 and the aeronautical light, and stream the image through the communicator 130 to be described later. Thus, the image camera 120 may support a ground manager to adjust an elevation angle and an illuminance of the aeronautical light by allowing the image obtained by photographing the aeronautical light to be relayed to the ground in real time. For example, the image camera 120 may be an optical camera or an infrared camera.

The communicator 130 is connected to the controller 110 and the image camera 120, converts data of the controller 110 and the image camera 120 into a radio signal, and transmits the radio signal. For example, image information of the image camera 120 may be transmitted to the image analyzer 132 on the ground through the communicator 130, and the GPS data and coordinate values of the GPS module of the controller 110 may be transmitted to the remote controller 131.

The remote controller 131 is connected to the communicator 130 through a wireless communication network to remotely control the controller 110. That is, the remote controller 131 may allow a user to verify the GPS data and coordinate values of the aerial vehicle 100, and support the user to manually control the aerial vehicle 100.

The image analyzer 132 is connected to the communicator 130 through the wireless communication network to verify and analyze the image data of the image camera 120 on the ground. That is, the image analyzer 132 may support to estimate and adjust the elevation angle and illuminance of the aeronautical light viewed from the aerial vehicle 100.

Figure 2:
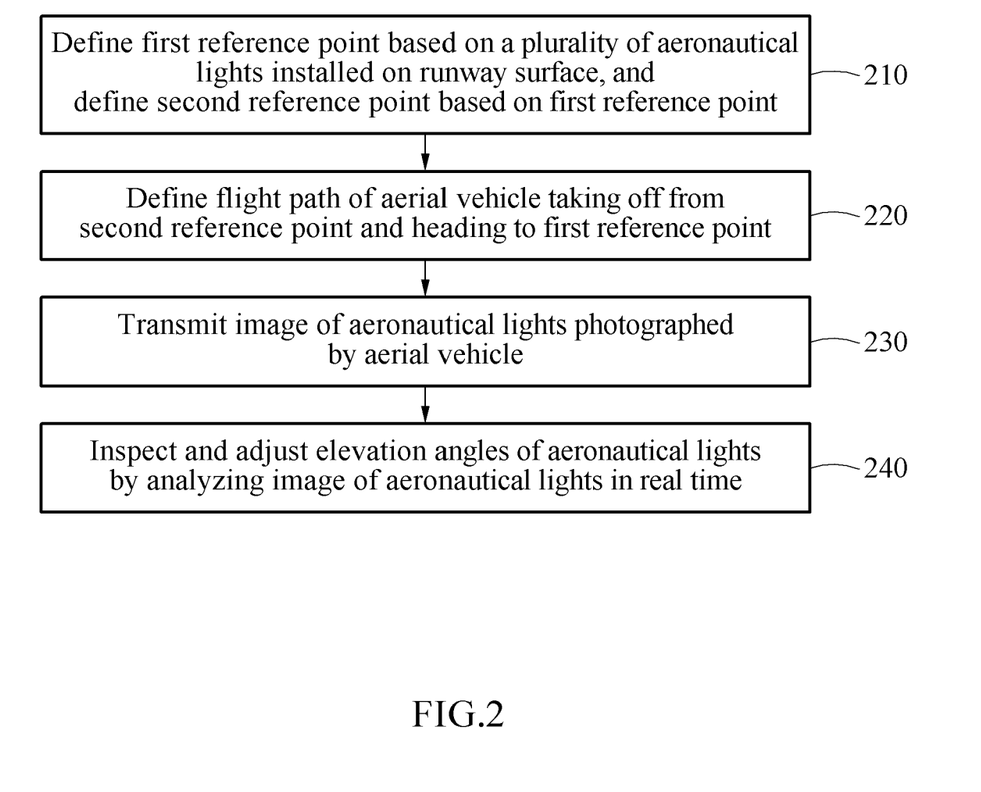
FIG. 2 is a flowchart illustrating an aeronautical light inspection method using an aerial vehicle according to an example embodiment.

FIG. 2 is a flowchart illustrating an aeronautical light inspection method using the aerial vehicle 100 according to an example embodiment.

Referring to FIG. 2, the aeronautical light inspection method using the aerial vehicle 100 includes defining a first reference point based on a plurality of aeronautical lights installed on a runway surface, and defining a second reference point based on the first reference point (operation 210). The first reference point is defined from a location of an aeronautical light to be inspected. The aeronautical light may include, for example, at least one light of a PAPI, an ALS, an REDL, an RTHL, an RTIL, an RCLL, a TDZL, and an RENL, and an elevation angle and an illuminance may be different for each aeronautical light.

For example, the first reference point may be a point at which an equal axis that horizontally connects a plurality of aeronautical lights and a runway center line meet. However, the first reference point is not limited thereto, and a reference point optimized for inspection according to a characteristic of each light may be defined using different criteria for defining the first reference point depending on a type of light.

In addition, the second reference point is defined based on the defined first reference point. For example, the second reference point may be a point that is set to be spaced apart by a predetermined distance as necessary from a point where the aerial vehicle 100 actually using a runway descends when landing.

Subsequently, the aeronautical light inspection method using the aerial vehicle 100 includes defining a flight path of the aerial vehicle 100 taking off from the second reference point and heading to the first reference point (operation 220).

Here, the defining of the flight path (operation 220) may include generating, based on the first reference point and the second reference point, an inspection flight path including a latitude value, a longitude value, and an altitude value, and allowing the aerial vehicle 100 to perform an automatic flight according to the flight path by providing the inspection flight path to the aerial vehicle 100.

In the generating of the inspection flight path, the aerial vehicle 100 may include the controller 110 so as to generate the inspection flight path, and the controller 110 may generate the inspection flight path in consideration of at least one item of an altitude, a horizontal angle, and a flight distance of the aerial vehicle 100.

Subsequently, the allowing of the aerial vehicle 100 to perform the flight, the aerial vehicle 100 takes off from the second reference point according to the inspection flight path inputted into the aerial vehicle 100, and adjusts a travel direction, speed, and altitude.

To this end, the aerial vehicle 100 includes a GPS module, and the GPS module receives GPS data and coordinate values of the aerial vehicle 100 in real time, compares the GPS data and coordinate values with the flight path inputted into the controller 110, and verifies whether the aerial vehicle 100 performs a flight at a fixed time and a fixed location to support to precisely calibrate a flight location.

Here, the allowing of the aerial vehicle 100 to perform the flight may include, when an elevation angle and an illuminance of an aeronautical light verified by the aerial vehicle 100 are out of an allowable range, determining that the aeronautical light is abnormal, and temporarily stopping the flight so as to inspect the aeronautical light. The aerial vehicle 100 may be provided with a necessary image and data value using a stop function during the flight, and a user may verify the image and data value in real time, and adjust or modify an elevation angle and the like of the aeronautical light on the ground.

In addition, the allowing of the aerial vehicle 100 to perform the flight may further include a manual flight function in which the user is able to directly control the aerial vehicle 100 using the remote controller 131, in addition to the automatic flight.

Subsequently, the aeronautical light inspection method using the aerial vehicle 100 includes transmitting an image of the aeronautical light photographed by the aerial vehicle 100 to the ground (operation 230).

In the transmitting of the image of the aeronautical light photographed by the aerial vehicle 100 to the ground (operation 230), a state of the aeronautical light is verified using the image camera 120 mounted on the aerial vehicle 100, and the image and data value is transmitted to the image analyzer 132 on the ground. Here, the image camera 120 generates an image signal, and transmits the image signal to the image analyzer 132 on the ground through a communication module. Here, the image camera 120 may be an optical camera or an infrared camera.

Subsequently, the aeronautical light inspection method using the aerial vehicle 100 includes inspecting and adjusting, based on data provided through the image analyzer 132, the elevation angle and illuminance of the aeronautical light (operation 240).

In the inspecting and adjusting of the elevation angle and illuminance of the aeronautical light (operation 240), the image signal transmitted in real time is analyzed through the image analyzer 132. Here, the elevation angle and illuminance of the aeronautical light may be adjusted in real time while the image photographed by the aerial vehicle 100 is displayed on the image analyzer 132.

FIGS. 3 to 8 are diagrams illustrating an example of an inspection flight path according to an example embodiment.

Figure 3:
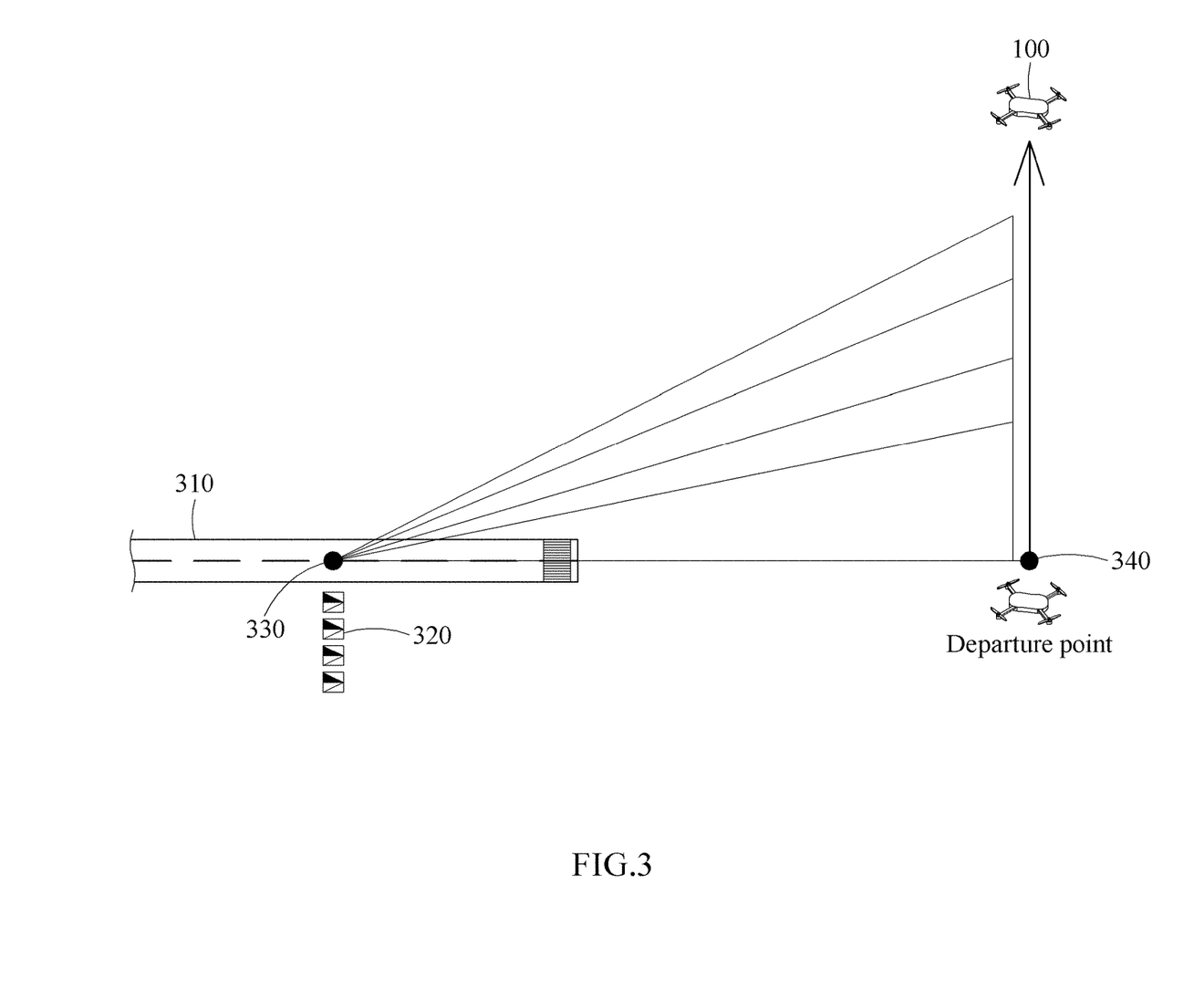
FIGS. 3 to 8 are diagrams illustrating an example of an inspection flight path according to an example embodiment.

Referring to FIG. 3, the inspection flight path includes a first path in which a vertically ascending flight is performed from a second reference point 340. The aerial vehicle 100 performs the vertically ascending flight from the second reference point 340 and photographs an aeronautical light 320 located in the vicinity of a runway 310. In this case, the aeronautical light 320 to be inspected may be a PAPI. A color change of the PAPI may be verified through an image transmitted from the aerial vehicle 100. Four PAPIs are installed in the vicinity of a first reference point 330, and an elevation angle is set differently for each PAPI. The PAPI is installed to be displayed in white at a location lower than an elevation angle of the PAPI and to be displayed in red at a location higher than the elevation angle. The aerial vehicle 100 may inspect whether the elevation angle of the PAPI is set appropriately by measuring an altitude value at which the color change of the PAPI occurs. In addition, an illuminance of the PAPI may also be inspected.

Figure 4:
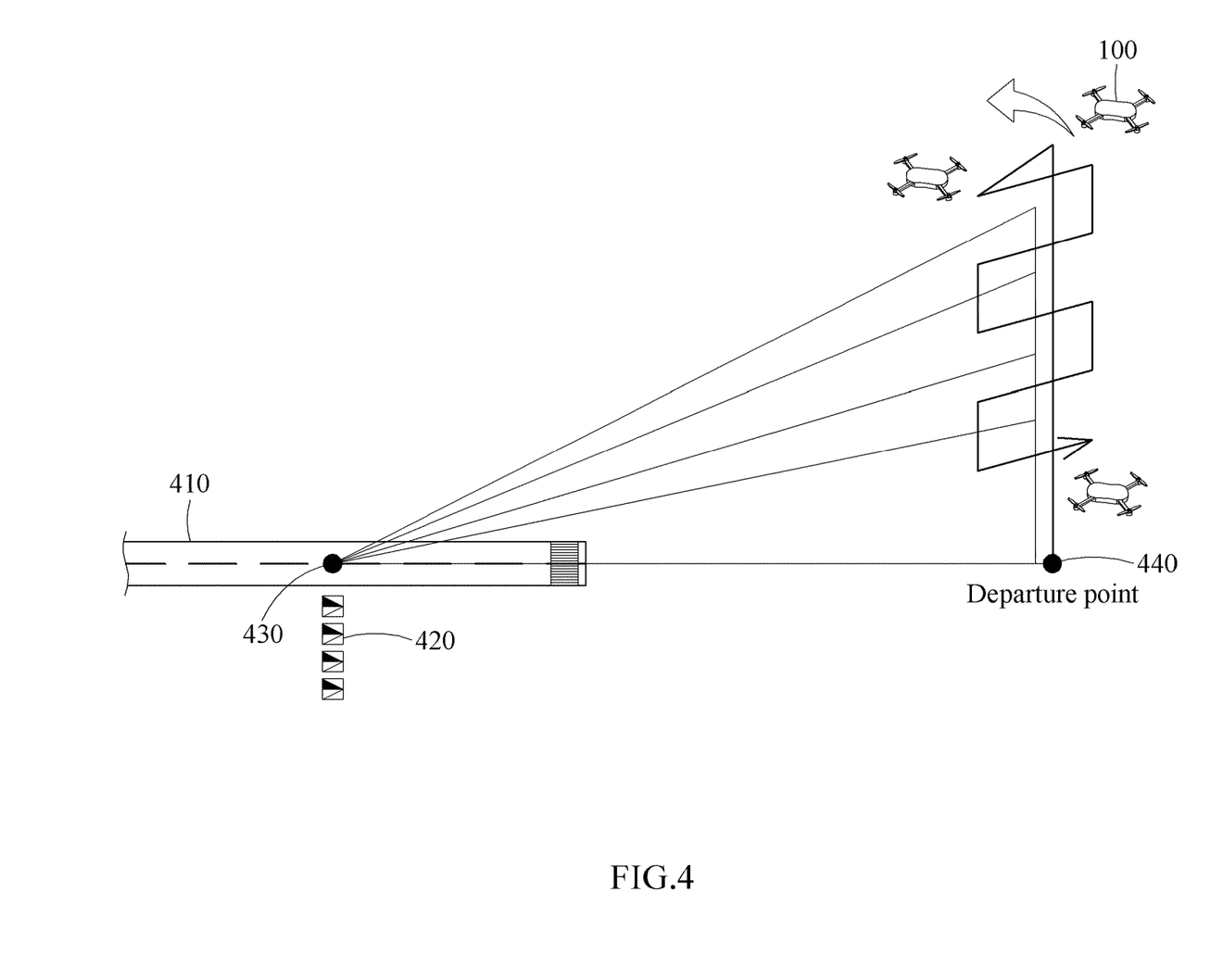

Referring to FIG. 4, the inspection flight path includes a second path in which the aerial vehicle 100 performs a leftward and rightward flight at a predetermined altitude height around a connection line that connects the first reference point 430 and the second reference point 440 to each other after ascending to the first path, and performs the leftward and rightward flight again and descends after descending at a predetermined altitude. The aerial vehicle 100 may inspect an elevation angle and an illuminance of an aeronautical light 420 installed in the vicinity of a runway 410 while performing a vertically ascending flight to the first path, and may inspect left and right coverage angles of the aeronautical light 420 while performing a leftward and rightward descending flight. In this case, the aeronautical light 420 to be inspected may exemplify a PAPI.

Figure 5:
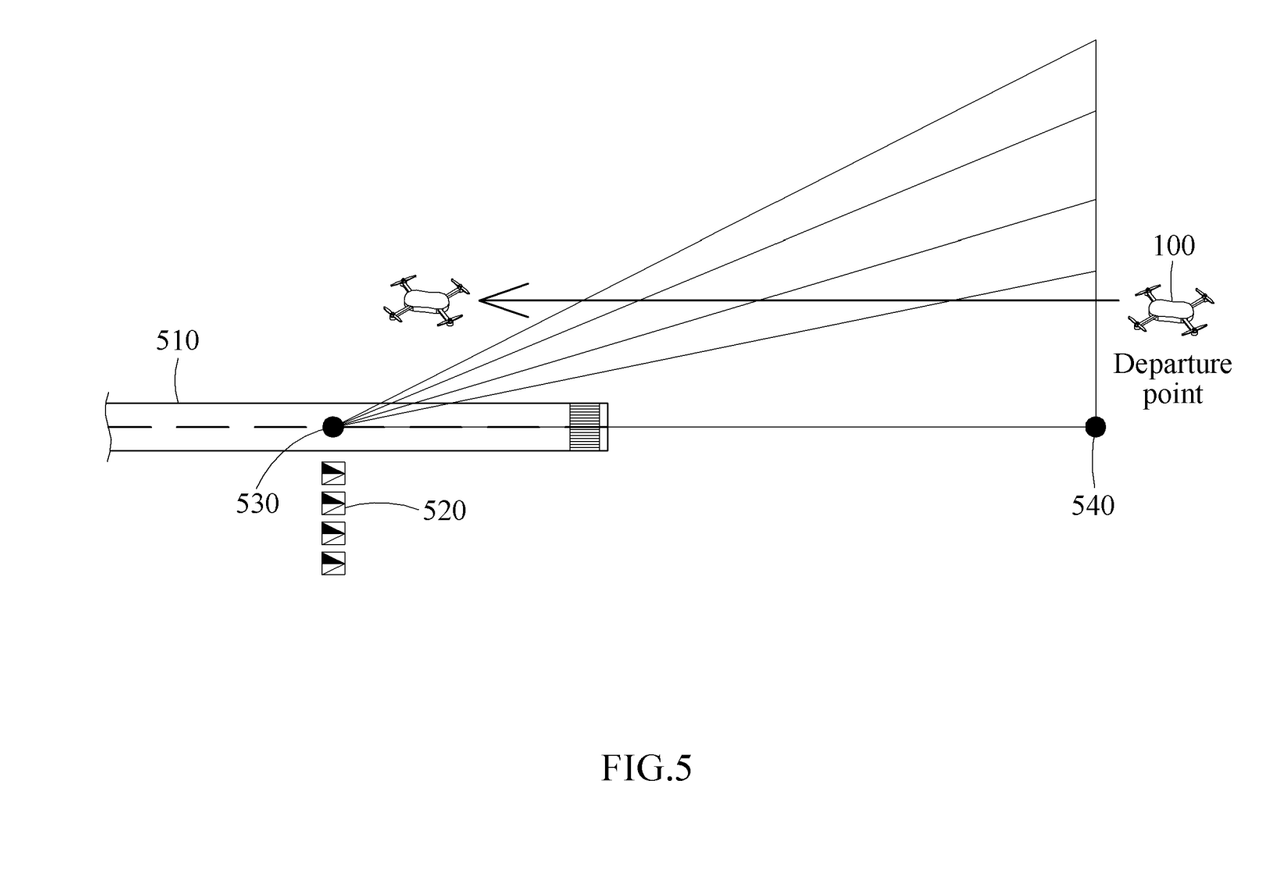

Referring to FIG. 5, the inspection flight path includes a third path in which the aerial vehicle 100 performs in a forward direction closer to a first reference point 530 while maintaining a predetermined altitude from a center line of a runway 510. The aerial vehicle 100 departs at a predetermined altitude height from a second reference point 540, and inspects an elevation angle and an illuminance of an aeronautical flight 520 installed in the vicinity of the first reference point 530 while maintaining an altitude and moving horizontally in a direction of the first reference point 530. The aerial vehicle 100 may inspect the overall elevation angle and illuminance of the aeronautical light 520 installed in the vicinity of the runway 510 while performing a flight in the third path. In this case, the aeronautical light 520 to be inspected may exemplify a PAPI, an ALS, an REDL, an RTHL, an RTIL, an RCLL, a TDZL, and an RENL.

Figure 6:
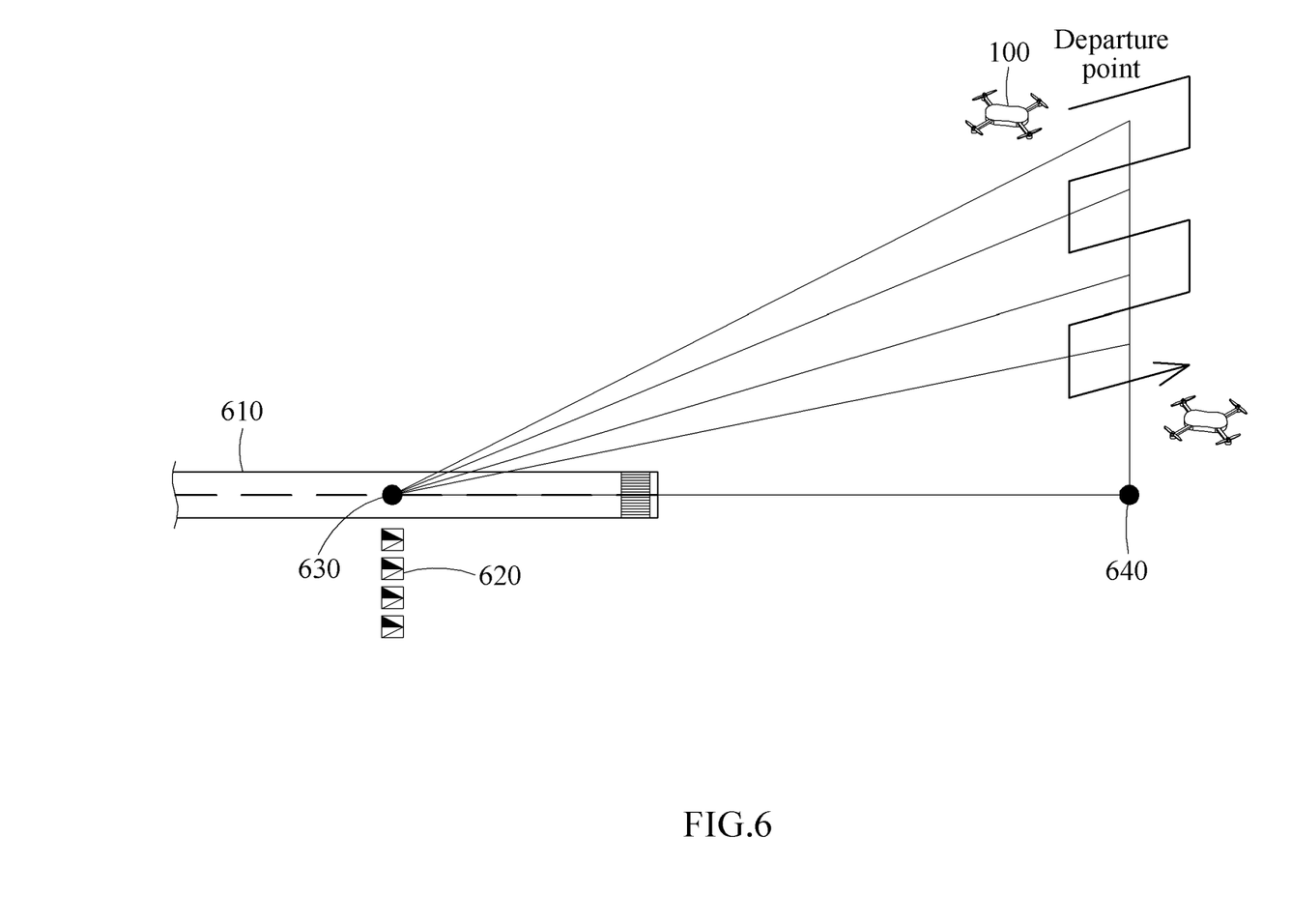

Referring to FIG. 6, the inspection flight path includes a sixth path in which the aerial vehicle 100 performs a leftward and rightward flight at a predetermined altitude height around a connection line that connects a first reference point 630 and a second reference point 640 to each other, and performs the leftward and rightward flight again and descends after descending at a predetermined altitude. The aerial vehicle 100 may simultaneously inspect left and right coverage angles, an elevation angle, and an illuminance of an aeronautical light 620 installed in the vicinity of a runway 610 while performing a flight in the fourth path. In this case, the aeronautical light 620 to be inspected may exemplify a PAPI, an ALS, an REDL, an RTHL, an RTIL, an RCLL, a TDZL, and an RENL.

Figure 7:
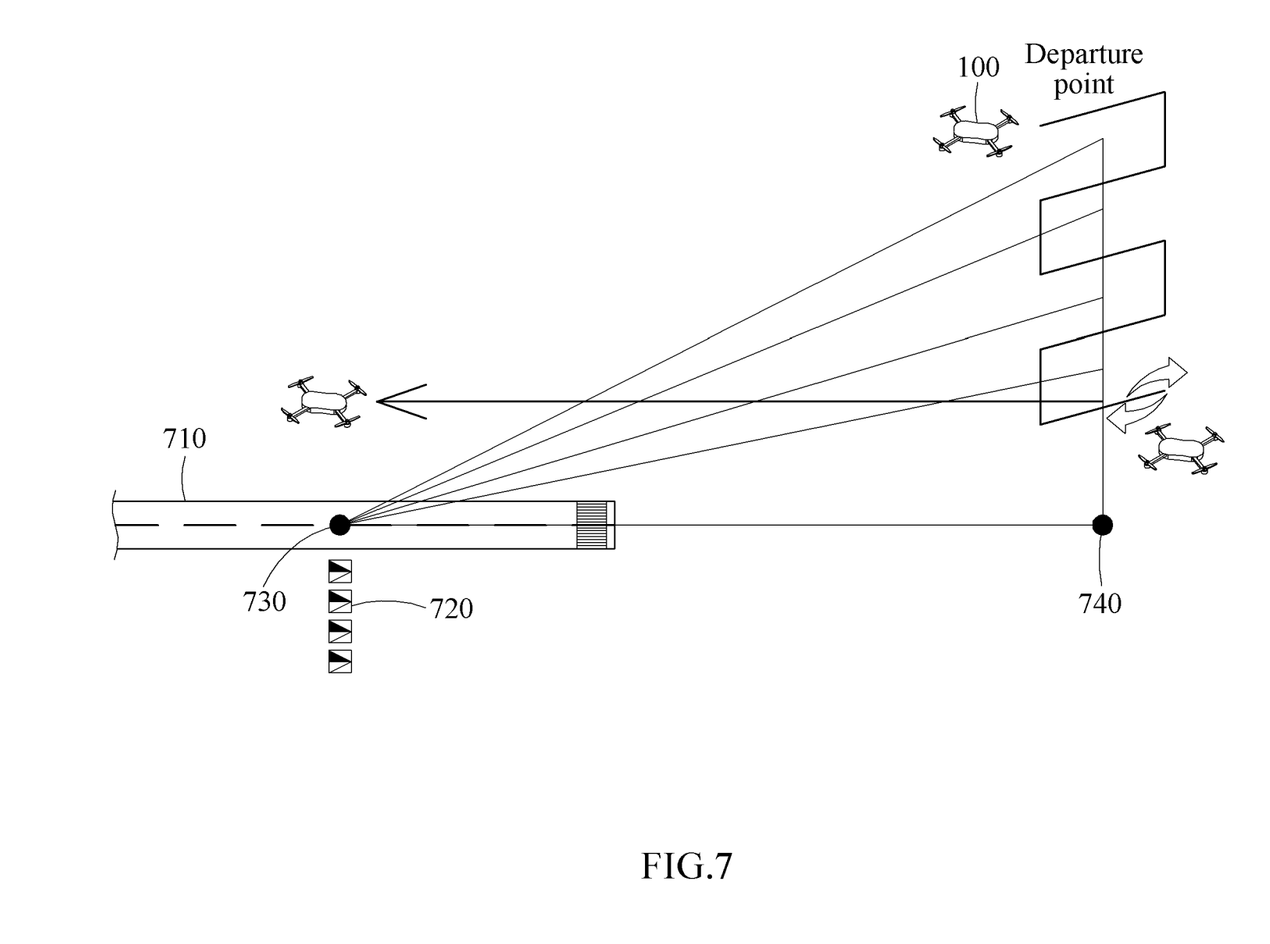

Referring to FIG. 7, the inspection flight path includes a fifth path in which the aerial vehicle 100 performs a flight in a forward direction closer to a first reference point 730 while maintaining a predetermined altitude from a center line of a runway 710 after descending to the fourth path. The aerial vehicle 100 may verify left and right coverage angles of an aeronautical light 720 installed in the vicinity of the runway 710 while performing a descending flight to the fourth path, and may inspect an elevation angle and an illuminance of the aeronautical light 720 while performing a flight in a forward direction closer to the first reference point 730. In this case, the aeronautical light 720 to be inspected may exemplify a PAPI, an ALS, an REDL, an RTHL, an RTIL, an RCLL, a TDZL, and an RENL.

Figure 8:
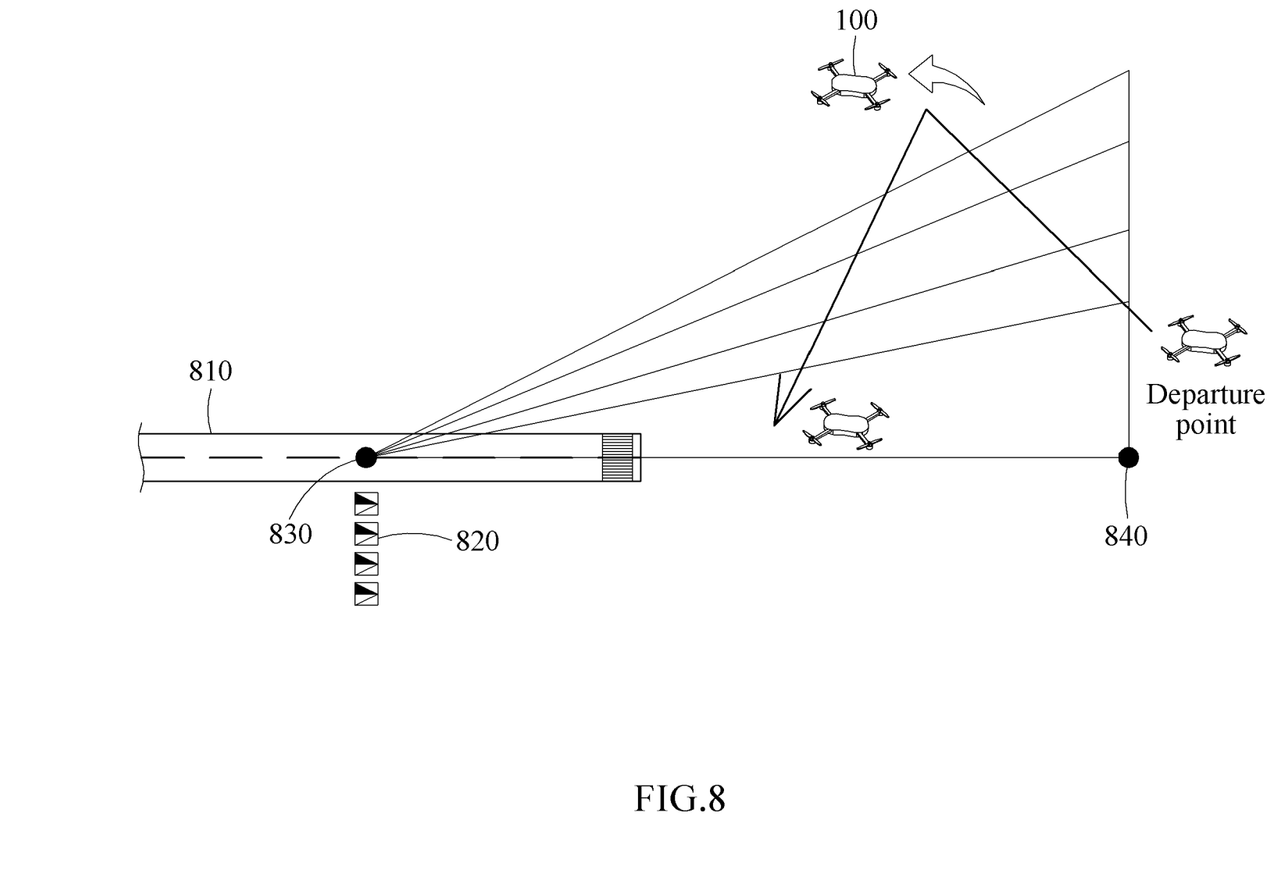

Referring to FIG. 8, the inspection flight path includes a sixth path in which the aerial vehicle 100 departs at a predetermined altitude from a center line of the runway 810, performs a forward ascending flight, and then performs a forward descending flight. The sixth path is a path similar to entry of an actual aircraft, and the aerial vehicle 100 may repeat ascending and descending while performing a flight in the sixth path, and inspect an elevation angle and an illuminance of an aeronautical light 820 installed in the vicinity of the runway 810. In this case, the aeronautical light 820 to be inspected may exemplify a PAPI, an ALS, an REDL, an RTHL, an RTIL, an RCLL, a TDZL, and an RENL.

According to the example embodiments, a method and apparatus for inspecting an aeronautical light using the aerial vehicle 100 may more precisely inspect the aeronautical light.

In addition, the method and apparatus for inspecting an aeronautical light using the aerial vehicle 100 may shorten time required to inspect the aeronautical light.

In addition, the method and apparatus for inspecting an aeronautical light using the aerial vehicle 100 may simultaneously inspect various types of aeronautical lights.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A method for inspecting an aeronautical light using an aerial vehicle, the method comprising:
   defining a first reference point based on a plurality of aeronautical lights installed on a runway surface, and defining a second reference point based on the first reference point;
   defining a flight path of the aerial vehicle taking off from the second reference point and heading to the first reference point;
   transmitting, to the ground, an image of the aeronautical lights photographed by the aerial vehicle; and
   inspecting and adjusting elevation angles of the aeronautical lights by analyzing the image of the aeronautical lights in real time.

2. The method of claim 1, wherein the defining of the flight path comprises:
   generating, based on the first reference point and the second reference point, an inspection flight path including a latitude value, a longitude value, and an altitude value; and
   allowing the aerial vehicle to perform an automatic flight according to the flight path by providing the inspection flight path to the aerial vehicle.

3. The method of claim 2, wherein the allowing of the aerial vehicle to perform the automatic flight comprises determining that the aeronautical lights are abnormal, and temporarily stopping a flight so as to inspect the aeronautical lights, when the elevation angles of the aeronautical lights are out of an allowable range.

4. The method of claim 2, wherein the inspection flight path comprises a first path in which the aerial vehicle performs a vertically ascending flight from the second reference point.

5. The method of claim 4, wherein the inspection flight path comprises a second path in which the aerial vehicle performs a leftward and rightward flight at a predetermined altitude around a connection line that connects the first reference point and the second reference point to each other after ascending to the first path, and performs the leftward and rightward flight again and descends after descending at the predetermined altitude.

6. The method of claim 2, wherein the inspection flight path comprises a third path in which the aerial vehicle performs a flight in a forward direction closer to the first reference point while maintaining a predetermined altitude.

7. The method of claim 2, wherein the inspection flight path comprises a fourth path in which the aerial vehicle performs a leftward and rightward flight at a predetermined altitude around a connection line that connects the first reference point and the second reference point to each other, and performs the leftward and rightward flight again and descends after descending at the predetermined altitude.

8. The method of claim 7, wherein the inspection flight path comprises a fifth path in which the aerial vehicle performs a flight in a forward direction closer to the first reference point while maintaining the predetermined altitude after descending to the fourth path.

9. The method of claim 2, wherein the inspection flight path comprises a sixth path in which the aerial vehicle departs from a predetermined altitude, and performs a forward descending flight after performing a forward ascending flight closer to the first reference point.

10. The method of claim 1, wherein the aeronautical lights are a precision approach path indicator (PAPI), an approach lighting system (ALS), a runway edge light (REDL), a runway threshold light (RTHL), a runway threshold identification light (RTIL), a runway center line light (RCLL), a touch-down zone light (TDZL), and a runway end light (RENL).

11. The method of claim 1, wherein the first reference point is a point where an axis that connects the plurality of aeronautical lights and a runway center line meet.

12. The method of claim 1, wherein the second reference point is a point spaced apart from the first reference point by a predetermined distance.

13. An apparatus for inspecting an aeronautical light using an aerial vehicle, the apparatus comprising:
   a controller provided in the aerial vehicle, the controller configured to define a flight path for the aerial vehicle;
   an image camera configured to photograph an image of a plurality of aeronautical lights on a runway as the aerial vehicle performs a flight in the flight path;
   a communicator connected to the controller and the image camera, the communicator configured to convert data of the controller and the image camera into a radio signal and transmit the radio signal;
   a remote controller provided on the ground, the remote controller connected to the communicator through a wireless communication network so as to remotely control the controller; and
   an image analyzer connected to the communicator through the wireless communication network so as to verify and analyze image data of the image camera on the ground.

\* \* \* \* \*